United States Patent
Vandermeer et al.

(10) Patent No.: US 6,991,022 B2
(45) Date of Patent: *Jan. 31, 2006

(54) INVESTMENT CASTING MOLD AND METHOD OF MANUFACTURE

(75) Inventors: John Vandermeer, Newark, DE (US); Kermit A. Buntrock, Williamsburg, VA (US); Thomas M. Branscomb, Portland, OR (US); Arlen G. Davis, Portland, OR (US)

(73) Assignee: Buntrock Industries, Inc, Williamsburg, VA (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/750,425

(22) Filed: Dec. 30, 2003

(65) Prior Publication Data

US 2004/0238158 A1    Dec. 2, 2004

Related U.S. Application Data

(63) Continuation-in-part of application No. 10/005,881, filed on Nov. 8, 2001, now Pat. No. 6,814,131.

(60) Provisional application No. 60/247,935, filed on Nov. 10, 2000.

(51) Int. Cl.
*B22C 1/00* (2006.01)
*B22C 9/04* (2006.01)

(52) U.S. Cl. .................... 164/519; 164/361
(58) Field of Classification Search ........ 164/516–519, 164/361
See application file for complete search history.

(56) References Cited

U.S. PATENT DOCUMENTS

| | | |
|---|---|---|
| 2,806,270 A | 9/1957 | Shaul |
| 2,829,060 A | 4/1958 | Emblem |
| 3,396,775 A | 8/1968 | Scott |
| 3,455,368 A | 7/1969 | Shepherd |
| 3,748,157 A | 7/1973 | Moore |
| 3,751,276 A | 8/1973 | Beyer |
| 3,878,034 A | 4/1975 | Bever |
| 4,196,769 A | 4/1980 | Feagin |
| 4,352,390 A | 10/1982 | Larson |
| 4,531,705 A | 7/1985 | Nakagawa et al. |
| 5,198,006 A | 3/1993 | Mimori et al. |
| 5,738,819 A | 4/1998 | Feagin |
| 6,000,457 A | 12/1999 | Vandermeer |
| 6,450,243 B1 | 9/2002 | Shaw et al. |
| 6,814,131 B2 * | 11/2004 | Vandermeer ................ 164/519 |

FOREIGN PATENT DOCUMENTS

| | | |
|---|---|---|
| CA | 2403204 | 9/2001 |
| EP | 207864 | 5/1991 |
| EP | 0763392 | 3/1997 |

(Continued)

Primary Examiner—Kuang Y. Lin
(74) Attorney, Agent, or Firm—Law Offices of John A. Parrish

(57) ABSTRACT

The invention relates to investment casting shell molds and their method of manufacture. The method entails mixing fiber such as ceramic refractory fiber and organic fiber with ceramic filler to form a dry blend. The dry blend is mixed with a binder sol such as colloidal silica sol to form slurry. An expendable preform is dipped into the slurry, stuccoed and dried. This step is repeated until a ceramic shell of a desired thickness is formed over the expendable preform. The expendable preform then is removed, and the green ceramic shell is fired. Molten metal then may be poured into the shell to form a metal casting.

36 Claims, 1 Drawing Sheet

FOREIGN PATENT DOCUMENTS

| | | |
|---|---|---|
| GB | 2294232 | 4/1996 |
| GB | 2350810 | 12/2000 |
| JP | 57206548 | 12/1982 |
| JP | 61202744 | 9/1986 |
| JP | 11156482 | 6/1999 |
| WO | WO 00/05009 | 2/2000 |
| WO | WO 01/68291 * | 9/2001 |
| WO | WO 02/038308 | 5/2002 |

* cited by examiner

US 6,991,022 B2

INVESTMENT CASTING MOLD AND METHOD OF MANUFACTURE

FIELD OF THE INVENTION

This invention relates to improved methods and compositions for investment casting technology.

BACKGROUND OF THE INVENTION

Investment casting by the lost wax process can be traced to ancient Egypt and China. The process as practiced today, however, is a relatively new technology dating to the 1930's and represents a rapidly growing business and science. Investment casting technology simplifies production of complex metal shapes by casting molten metal into expendable ceramic shell molds formed around disposable wax preforms which duplicate the desired metal shape. "Precision Investment Casting", i.e., PIC, is the term in the art that refers to this technology.

The conventional PIC process employs six major steps:

(1) Preform preparation.

A disposable positive preform of the desired metal casting is made from a thermoplastic material such as wax that will melt, vaporize or burn completely so as not to leave contaminating residues in the de-waxed ceramic shell mold. The positive preform is prepared by injecting the thermoplastic material into a negative, segmented, metal die or "tool" designed to produce preforms of the shape, dimension and surface finish required for the metal casting. Single or multiple preforms can be assembled by fusing them to a disposable wax "sprue system" that feeds molten metal to fill the shell mold;

(2) Shell mold construction by:

(a) dipping the preform assembly into a refractory slurry having fine particulate refractory grain in an aqueous solution of alkali stabilized colloidal silica binder to define a coating of refractory material on the preform;

(b) contacting the refractory coating with coarse dry particulate refractory grain or "stucco" to define a stucco coating, and (c) air drying to define a "green" air dried insoluble bonded coating. These process steps can be repeated to build by successive coats a "green", air dried shell mold of the desired thickness.

(3) Dewaxing—The disposable wax preform is removed from the "green" air dried shell mold by steam autoclaving, plunging the green shell mold into a flash de-waxing furnace heated to 1000° F.–1900° F., or by any other method which rapidly heats and liquefies the wax so that excessive pressure build-up does not crack the shell mold.

(4) Furnacing—The de-waxed shell mold is heated at about 1600° F.–2000° F. to remove volatile residues and form stable ceramic bonds in the shell mold.

(5) Pouring—The heated shell mold is recovered from the furnace and positioned to receive molten metal. The metal may be melted by gas, indirect arc, or induction heating. The molten metal may be cast in air or in a vacuum chamber. The molten metal may be poured statically or centrifugally, and from a ladle or a direct melting crucible. The molten metal is cooled to produce a solidified metal casting in the mold.

(6) Casting recovery—The shell molds having solidified metal castings therein are broken apart and the metal castings are separated from the ceramic shell material. The castings can be separated from the sprue system by sawing or cutting with abrasive disks. The castings can be cleaned by tumbling, shot or grit blasting.

Investment casting shell molds tend to be fragile and prone to breakage. In an effort to improve the strength of investment casting shell molds, small amounts of chopped refractory fibers and or in combination with chopped organic fibers have been added to aqueous refractory slurries. Refractory slurries which include these small amounts of chopped refractory fibers enable application of thicker coatings to a preform. These slurries, however, require significant additions of polymer to achieve satisfactory green strength and flow properties of the slurry.

A need therefore exists for materials and methods which provide investment casting shell molds which have improved strength and avoids the disadvantages of the prior art.

SUMMARY OF THE INVENTION

The invention relates to rapidly forming a ceramic shell mold on an expendable preform, and to the ceramic shell molds obtained thereby. In a first aspect, the method entails mixing ceramic fiber, glass fiber, and ceramic filler to form first dry blend; mixing the first dry blend with a colloidal sol such as an aqueous colloidal silica sol to form a prime coat slurry; mixing ceramic filler, glass fiber and ceramic fiber to form a second dry blend, mixing the second dry blend with a colloidal sol such as an aqueous colloidal silica sol to form a backup coat slurry which may be the same or different from the prime coat slurry; applying a coating of the prime coat slurry onto an expendable preform to produce a prime coated preform; applying a stucco of refractory material onto the prime coated preform; drying the stuccoed, prime coated preform; applying a coating of backup coat slurry onto the stuccoed, prime coated preform to produce a backup coated preform; applying a stucco of refractory material onto the backup coated preform to produce a stuccoed, backup coated preform; drying the stuccoed, backup coated preform; removing the expendable preform to produce a green shell mold; and heating the green shell mold to a temperature sufficient to produce a ceramic shell mold.

In another aspect of the invention, manufacture of an investment casting mold relates to mixing any of organic fibers, ceramic fibers and mixtures thereof together with one or more ceramic fillers to form a first dry blend. Fiber and ceramic filler also are mixed to form a second dry blend which may be the same or different from the first dry blend. The ceramic filler may have a particle size of about 20 mesh to about 600 mesh, preferably about −120 mesh to about −325 mesh. The ceramic filler may be employed in admixture with calcined coke.

The first dry blend is mixed with a first colloidal sol to form a prime coat slurry. The second dry blend is mixed with a second colloidal sol which may be the same or different from the first colloidal sol to form a backup coat slurry which may be the same or different from the prime coat slurry. Useful colloidal sols include but are not limited to colloidal silica sol, colloidal silica sol modified by latex, ethyl silicate, ionic silicates, or mixtures thereof, preferably colloidal silica.

A coating of the prime coat slurry is applied onto an expendable preform such as plastic or wax to produce a prime coated preform. The prime coated preform then is stuccoed with refractory material and dried. A coating of the backup coat slurry then is applied onto the stuccoed, prime coated preform to produce a backup coated preform. Stucco of refractory material is applied to the backup coated preform to produce a stuccoed, backup coated preform which then is dried. The expendable preform is removed to produce a green shell mold which is fired to produce a ceramic shell mold.

In yet another aspect of the invention, a first prime coat slurry is applied to an expendable preform to produce a first prime coated preform which is stuccoed and dried to produce a stuccoed first prime coated preform. A second prime coat slurry then is applied, stuccoed and dried to produce a preform that has a plurality of prime coats. A backup coat slurry then is applied, stuccoed and dried. A plurality of backup coats may be applied. The expendable preform is removed and the resulting green shell mold is fired to produce a ceramic shell mold. The first prime coat slurry may be formed by mixing one or more ceramic fillers with a colloidal sol. A dry blend of one or more ceramic fillers with fibers such as ceramic fibers and organic fibers such as nylon and polypropylene also may be mixed with a colloidal sol to form the first prime coat slurry. The second prime coat slurry, as well as the backup coat slurry, may be formed by mixing a dry blend of one or more ceramic fillers with fibers such as ceramic fibers and organic fibers such as nylon and polypropylene. Colloidal sols employed in the first prime coat slurry, the second prime coat slurry and the backup coat slurry may be the same or different. Useful colloidal sols include but are not limited to colloidal silica sol, colloidal silica sol modified by latex, ethyl silicate, ionic silicates, and mixtures thereof, preferably colloidal silica sol and colloidal silica sol modified by latex.

In still another aspect of the invention, one or more ceramic fillers are admixed with a colloidal sol to produce a prime coat slurry that is substantially free of fiber. A backup coat slurry is formed by mixing a blend of fiber and ceramic filler admixed with a colloidal sol. As understood, a prime coat slurry that is substantially free of fiber may include up to about 0.5 wt. % fiber based on the weight of filler. Fibers which may be used in the backup coat slurry include but are not limited to ceramic fibers, glass fibers, and organic fibers. Useful organic fibers include but are not limited to nylon and polypropylene. The ceramic filler used in the backup coat slurry may be the same or different from any of the ceramic fillers used in the prime coat slurry. Colloidal sols used in the prime coat and backup coat slurries also may be the same or different. Colloidal sols which may be used in the prime coat and backup coat slurries include but are not limited to colloidal silica sol, and colloidal silica sol modified by polymers such as latex, ethyl silicate, ionic silicates, and mixtures thereof, preferably colloidal silica sol and colloidal silica sol modified by latex.

In this aspect of the invention, the prime coat slurry is applied onto an expendable preform to produce a prime coated preform that is stuccoed and dried to produce a stuccoed prime coated preform. The backup coat slurry then is applied, stuccoed and dried to produce a stuccoed, backup coated preform. A plurality of backup coats may be applied. The expendable preform then is removed and the resulting green shell mold is fired to produce a ceramic shell mold.

The invention offers a number of advantages for the manufacture of ceramic shell molds over the prior art. For example, forming dry blends of fibers and ceramic filler enables easy addition of ceramic filler and fibers to the colloidal sol binder without the need to continuously mix or re-mix the colloidal sol and fiber pre-blend prior to use. Another advantage is that the fibers do not need to be pre-dispersed in a liquid binder or combined with a polymeric addition prior to adding ceramic filler. A further advantage is that use of polymeric binder additives to achieve improved green strength is not required. Another advantage is that the invention avoids the prior art problem of fiber agglomeration under high shear mixing. A further advantage is that the slurries which use dry blends which include fiber build thicker coatings per dip. Use of slurries which employ dry blends which include fiber also build more uniform shells of greater thickness compared to slurries which employ blends that do not include fiber.

DETAILED DESCRIPTION OF THE INVENTION

Dry Blends

Figure 1:
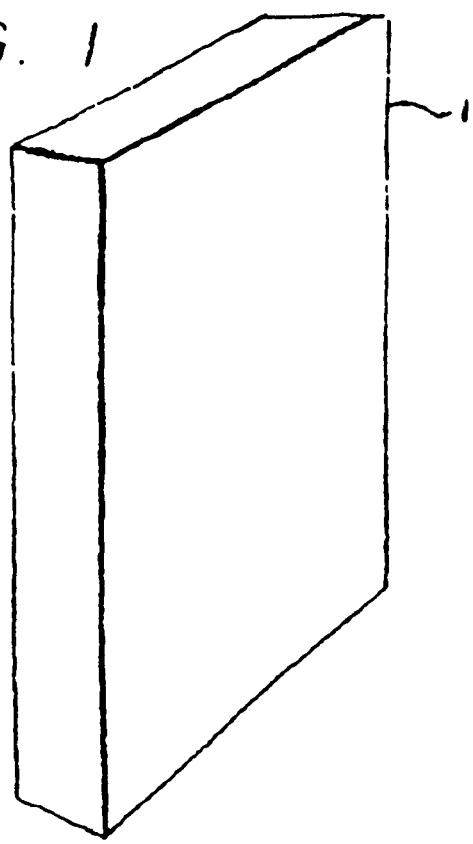
FIG. 1 illustrates a positive disposable preform 1 of a desired metal casting.

Dry blends which may be used in the various aspects of the invention include one or more ceramic fillers, and one or more ceramic fillers with fibers such as ceramic fibers and organic fibers. Ceramic fillers which may be employed include but are not limited to fused silica, alumina, and aluminosilicates such as mullite, kyanite, and molochite, zircon, chromite, rice hull ash, calcined coke and mixtures thereof. The ceramic filler typically is about 20 mesh to about 600 mesh, preferably −120 mesh to about −325 mesh.

Ceramic fibers which may be employed typically have but are not limited to those which have an aspect ratio of length to width of about 20:1. Examples of useful ceramic fibers include but are limited to Orleans One fiber of Wollastonite from the Orleans Resource Group, located in Quebec, Canada, NIAD G fiber of Wollastonite from NYCO Minerals Co. in Willsboro, N.Y., metal fibers, aramid fibers, carbon fibers, as well as chopped or milled ceramic fibers such as aluminosilicates such as mullite, oxides such as alumina and zirconia, nitrides such as silicon nitride, carbon, and carbides such as silicon carbide, and mixtures thereof. Chopped and milled ceramic fibers are commercially available from numerous sources such as Thermal Ceramics Corp.

Glass fibers which may be employed in the dry blends include but are not limited to chopped and milled glass fibers. Chopped glass fibers which may be employed include but are not limited to E-glass fibers and S-glass fibers and mixtures thereof. Examples of E-glass fibers which may be employed include but are not limited to those which measure about 3 mm to about 6 mm long and have a diameter of about 10 microns such as those from PPG Industries, Shelby, N.C. under the trade name Chop Vantage 8610. Chopped S-glass fibers which may be employed include but are not limited to those which measure about 3 mm to about 6 mm long and have a diameter of about 10 microns such as those available from AGY Inc. Aiken, S.C. Examples of useful milled E-glass fibers include but are not limited to 731ED 3 mm floccular fibers which have a length of about 0.125 inch, an average diameter of 15.8 microns and a bulk density of 0.17 gm/cm$^3$ from Owens Corning Co.

Organic fibers which may be employed in the dry blends include but are not limited to olefins, amides, aramids, polyesters and cellulose fibers. Examples of olefins which may be used include but are not limited to polyethylene and polypropylene such as those from Minifibers, Inc. Examples of amide fibers include nylon fibers such as those from Wex Chemical Co. Examples of aramid fibers which may be used include but are not limited to Kevlar from DuPont and Twaron from Akzo Nobel. Examples of polyester fibers which may be used include those from Wex Chemical Co. Examples of cellulose fibers include those from Interfibe Corp.

In the dry blends, the amount of fiber may be varied over a wide range. Where a dry blend includes an admixture of ceramic fiber, glass fiber and ceramic filler, ceramic fiber may be about 1 wt. % to about 10 wt. % by weight of the dry blend, glass fiber may be about 0.5 wt. % to about 10 wt. % by weight of the dry blend, and ceramic filler may be about 80 wt. % to about 98.5 wt. % by weight of the dry blend.

Where a dry blend includes an admixture of ceramic fiber, glass fiber, ceramic filler, and organic fiber, ceramic fiber may be about 1 wt. % to about 10 wt. % by weight of the dry blend, glass fiber may be about 0.5 wt. % to about 10 wt. % by weight of the dry blend, and ceramic filler may be about 76 wt. % to about 98 wt. % by weight of the dry blend, and organic fiber may be about 0.3 wt. % to about 4 wt. % by weight of the dry blend.

Where a dry blend includes an admixture of ceramic fiber, ceramic filler, and organic fiber, the ceramic fiber may be about 0.5 wt. % to about 10 wt. % by weight of the dry blend, ceramic filler may be about 86 wt. % to about 98.2 wt. % by weight of the dry blend, and organic fiber may be about 0.3 wt. % to about 4.0 wt. % by weight of the dry blend.

Where a dry blend includes an admixture of ceramic fiber and ceramic filler, the ceramic fiber may be about 1 wt. % to about 10 wt. % by weight of the dry blend, and ceramic filler may be about 90 wt. % to about 99 wt. % by weight of the dry blend.

Where a dry blend includes an admixture of organic fiber and ceramic filler, the organic fiber may be about 0.3 wt. % to about 5 wt. % by weight of the dry blend, and ceramic filler may be about 99.7 wt. % to about 95 wt. % by weight of the dry blend.

Preparation of Refractory Slurries

A refractory slurry for use as a prime coat slurry or a backup coat slurry is prepared by mixing a dry blend with a colloidal sol. Preferably the sol is an aqueous colloidal silica sol available under the trade name Megasol® from Wesbond, Inc., Wilmington, Del. Megasol® aqueous silica sols are available in a range of pH values, titratable $Na_2O$ contents, as well as solids contents. Megasol® aqueous silica sols have an average particle size of about 40 nanometer, a particle size range of about 6 nm to about 190 nm, and a standard deviation of particle sizes of about 20 nm. The pH of the Megasol® aqueous silica sols may vary from about 8.0 to about 10.0, preferably about 9.0 to about 9.5; the titratable $Na_2O$ content can vary from about 0.02% to about 0.5%, preferably about 0.1% to about 0.25%, most preferably about 0.20% to about 0.22%, and a solids content of about 30% to about 50% solids content, preferably about 40 to about 47% solids content, more preferably, about 45% solids content. Other aqueous colloidal silica sols such as MegaPrime from Buntrock Industries, Inc. Williamsburg, Va.; Nyacol 830 from EKA Chemical Co., Nalcoag 1130 and Nalcoag 1030 from Nalco Chemical Co., as well as Ludox SM-30 and Ludox HS-30 from W.R. Grace & Co., may be used.

Prime coat slurries and backup coat slurries are prepared by placing a colloidal sol, preferably a colloidal silica sol, more preferably Megasol®, into a clean, water rinsed mixing tank and adding the dry blend of material while mixing. Various mixing devices known in the art may be employed in the mixing tank. These devices include, for example, propeller type mixers, jar mills, high speed dispersion mixers, and turntable fixed blade mixers. The dry blend is added while mixing until a suitable viscosity is reached.

For prime coat slurries, a suitable viscosity is typically about 18–30 seconds No. 4 Zahn, preferably 20–30 sec, most preferably 24–30 sec. For backup coat slurries, suitable viscosities typically are about 10–18 sec. viscosity Zahn #5, preferably about 10–16 sec Zahn#5, most preferably about 12–15 sec Zahn #5. In each of the prime coat slurries and backup slurries, additional mixing can be performed to remove entrapped air and to reach equilibrium. A final viscosity adjustment can be made by adding additional Megasol® colloidal silica sol binder or refractory material, as well as non-ionic surfactants and anionic surfactants.

Various refractory slurry compositions may be used as prime coat slurries and backup coat slurries. Specific prime coat slurries and backup coat slurries are determined by the characteristics desired in the ceramic shell mold in order to produce a metal casting of desired dimensions and surface finish. Useful prime coat slurries employ fine size refractory grain, typically about –200 mesh to about –325 mesh. Examples of useful prime coat slurries include Megasol® together with a blend of –200 mesh fused silica and –325 mesh zircon refractory grain. The zircon refractory grain provides high resistance to molten metal. The fine particle size of the zircon also enables production of castings which have smooth, detailed surface finishes. In these types of prime coat slurries which employ a ceramic filler of both fused silica and zircon, the fused silica suitably can have sizes such as about –100 mesh, about –120 mesh, about –140 mesh, about –170 mesh, about –270 mesh and about –325 mesh, most preferably about –120 to about –200 mesh. The zircon suitably can have a particle size such as about –200 mesh, about –325 mesh and about –400 mesh, preferably, about –200 mesh, most preferably about –325 mesh.

Prime coat slurries also may include one or more non-ionic surfactants. A particularly useful non-ionic surfactant is PS9400 available from Buntrock Industries, Williamsburg, Va. This surfactant improves the ability of the prime coat refractory slurry to wet a wax preform and assists in drainage. Surfactants may be added to the prime coat refractory slurry various amounts depending on the composition of the prime coat slurry. For example, where the slurry includes a dry blend of fused silica and zircon with Megasol® a surfactant may be used in an amount of up to about 0.2% based on the weight of the Megasol®.

Backup slurries employ coarser refractory grain sizes than are used in prime coat slurries. For example, in backup slurries where fused silica is employed as a ceramic filler, the fused silica typically has a particle size of about –80 mesh to about –270 mesh, preferably about –100 mesh to about –200 mesh, most preferably, about –100 mesh to about –120 mesh. The amounts of dry blend and aqueous colloidal silica sol used to form a backup slurry may vary over a wide range. Typically, the dry blend may be about 54 wt. % to about 70 wt. % based on the total weight of the slurry, remainder aqueous silica sol.

Manufacture of refractory slurries illustrative of the invention is described below by reference to the following non-limiting examples.

EXAMPLE 1

This example illustrates forming refractory slurry by mixing a dry blend that includes ceramic filler, refractory fiber, and glass fiber and mixing that dry blend with an aqueous colloidal silica sol.

100 grams Orleans One refractory fiber of Wollastonite, 20 grams 731 ED ⅛" milled E-glass fiber, and a ceramic filler that includes 715 gms fused Silica 120 (120 mesh fused silica from C-E Minerals Co., Greenville, Tenn.) and 715 gms fused Silica 200 (200 mesh fused silica from C-E Minerals Co., Greenville, Tenn.) are dry mixed to form a dry blend.

The dry blend is mixed with 1000 gms of Megasol® that has a solids content of 45%, a pH of 9.5 and a titratable $Na_2O$ content of 0.2% to form a refractory slurry.

EXAMPLE 2

This example illustrates forming a refractory slurry by mixing a dry blend that includes ceramic filler, refractory fiber, glass fiber, and organic polymeric fiber and mixing that dry blend with an aqueous colloidal silica sol.

100 grams Orleans One refractory fiber of Wollastonite, 20 grams 731 ED ⅛" milled E-glass fiber, a ceramic filler that includes 715 gms fused Silica 120 and 715 gms fused Silica 200 are dry mixed with 20 grams polyethylene fiber that has a length of 1 mm and a diameter of 0.5 micron to form a dry blend.

The dry blend is mixed with 1000 gms of the Megasol® of example 1 to form a refractory slurry.

EXAMPLE 3

This example illustrates forming a refractory slurry by mixing a dry blend that includes ceramic filler, refractory fiber and organic polymeric fiber and mixing that dry blend with an aqueous colloidal silica sol.

100 grams Orleans One refractory fiber of Wollastonite, 20 grams polyethylene fiber having a length of 1 mm and a diameter of 1 micron, and a ceramic filler that includes 715 gms fused Silica 120 and 715 gms fused Silica 200 are dry mixed to form a dry blend.

The dry blend is mixed with 1000 gms of the Megasol® of example 1 to form a refractory slurry.

EXAMPLE 4

This example illustrates forming a refractory slurry by mixing a dry blend that includes ceramic filler, glass fiber and organic polymeric fiber and mixing that dry blend with an aqueous colloidal silica sol.

100 grams 731 ED ⅛" milled E-glass fiber, 20 grams polyethylene fiber having a length of 1 mm and a diameter of 1 micron, and a ceramic filler that includes 715 gms fused Silica 120 and 715 gms fused Silica 200 are dry mixed to form a dry blend.

The dry blend is mixed with 1000 gms of the Megasol® of example 1 to form refractory slurry.

EXAMPLE 5

This example illustrates forming a refractory slurry by mixing a dry blend that includes refractory fiber and glass fiber and mixing that dry blend with a blend of an aqueous colloidal silica sol and ceramic filler.

100 grams Orleans One refractory fiber of Wollastonite and 20 grams 731 ED ⅛" milled E-glass fiber mixed dry to form a dry blend.

The dry blend is admixed with a mixture that includes 1000 gms of the Megasol® of example 1 and a ceramic filler that includes 715 gms fused Silica 120 and 715 gms fused Silica 200 to form a refractory slurry.

EXAMPLE 6

This example illustrates forming a refractory slurry by mixing a dry blend that includes refractory fiber, glass fiber and organic polymeric fiber and mixing that dry blend with a blend of an aqueous colloidal silica sol and ceramic filler.

100 grams Orleans One refractory fiber of Wollastonite, 20 grams polyethylene fiber having a length of 1 mm and a diameter of 0.5 mm, and 100 grams 731 ED ⅛" milled E-glass fiber are mixed dry to form a dry blend.

The dry blend is admixed with a mixture that includes 1000 gms of the Megasol® of example 1 and a ceramic filler that includes 715 gms fused Silica 120 and 715 gms fused Silica 200 to form a refractory slurry.

EXAMPLE 7

This example illustrates forming a refractory slurry by mixing a dry blend that includes ceramic filler and glass fiber and mixing that dry blend with an aqueous colloidal silica sol.

100 grams 731 ED ⅛" milled E-glass fiber and a ceramic filler that includes 715 gms fused Silica 120 and 715 gms fused Silica 200 are dry mixed to form a dry blend.

The dry blend is mixed with 1000 gms of the Megasol of example 1 to form a refractory slurry.

EXAMPLE 8

This example illustrates forming refractory slurry by mixing a dry blend that includes ceramic filler and refractory fiber with an aqueous colloidal silica sol.

100 grams Orleans One refractory fiber of Wollastonite and a ceramic filler that includes 715 gms fused Silica 120 and 715 gms fused Silica 200 are dry mixed to form a dry blend.

The dry blend is mixed with 1000 gms of the Megasol of example 1 to form a refractory slurry.

EXAMPLE 8A

This example illustrates forming a refractory slurry by mixing a dry blend that includes ceramic filler and glass fiber with an aqueous colloidal silica sol.

20 grams 731 ED ⅛" milled E-glass fiber and a ceramic filler that includes 715 gms fused Silica 120 and 715 gms fused Silica 200 are dry mixed to form a dry blend.

The dry blend is mixed with 1000 gms of the Megasol of example 1 to form a refractory slurry.

Ceramic Shell Mold

In forming a ceramic shell mold, a disposable preform, preferably a wax preform such as filled or unfilled paraffin based investment casting grade wax or microcrystalline wax, is dipped into a prime coat slurry to coat the surface of the preform with a continuous layer of prime coat slurry. Typically, one to three coatings of a prime coat slurry are applied. The prime coat(s) applied can have thicknesses of about 0.02" to 0.2", preferably 0.04" to 0.2", most preferably 0.04" to 0.1". The coated preform is drained thoroughly to remove excess slurry, and then stuccoed with fine grained, refractory stucco to produce a stuccoed prime coat. The stuccoed prime coat then is dried prior to application of any additional prime coat. A backup coat is applied over the stuccoed prime coat, and also stuccoed. The stuccoed backup coat then is dried prior to application of an additional backup coat. Application of backup coats is repeated until the shell formed on the preform reaches a desired thickness and strength.

The drying time between successive prime coats and backup coats depends on the complexity of the shape of the disposable preform. Disposable preforms which have deep cavities where airflow is minimal take longer to dry between coats. Drying can be performed at about 60° F. to about 90° F., preferably about 70° F. to about 75° F. Drying may be performed under accelerated conditions of low humidity and high temperature with rapid air movement. A thickness of ceramic shell mold of about 0.20 inch to about 0.5 inch is sufficient for most castings. Two prime coats and 4 to 5 backup coats typically yield a 0.25 inch thick ceramic shell mold that has a strength sufficient to withstand dewaxing and furnacing.

A wide variety of refractory grains may be used as stucco on prime coat slurries and backup coat slurries. Examples of useful refractory grains include but are not limited to mullite, calcined china clay and other aluminosilicates, vitreous and crystalline silica, alumina, zircon and chromite. The refractory grains preferably are free of ionic contaminates in amounts that can contribute to instability of the refractory grains and to thermally induce phase changes during metal casting. As is known in the art, refractory grains which are free from contaminates in amounts that can contribute to instability of the refractory grains can be produced by purification with or without calcining.

Refractory grains for application as stucco to the prime coat include but are not limited to zircon sand of about −70 mesh to about 200 mesh, preferably about −70 to about 140 mesh. The refractory grains which may be used as stucco on the backup coats may vary from about −10 mesh to about 200 mesh, preferably about −20 mesh to about 50 mesh. Most preferably, the refractory grains have a size of about −30 mesh to about 50 mesh.

In an alternative embodiment, a transitional stucco refractory material, preferably zircon or an alumino silicate which has a grain size intermediate between the fine grained prime coat stucco and the coarse backup coat stucco, such as a grain size of about −50 mesh to about +100 mesh, may be applied to the prime coat-stuccoed disposable preform prior to application of the coating of backup slurry. The transitional stucco coat can be used to add strength and to minimize the possibility of delamination between the final coating of prime coat slurry and the first coating of backup slurry.

Dewaxing

The ceramic shell molds may be dewaxed by methods such as immersion into boiling water, steam autoclaving, and flash dewaxing as is known in the art. Steam autoclaving may be performed by:

1. Using as high a steam pressure as possible, preferably about 60 PSI or higher, more preferably about 80–90 PSI.

2. Closing and pressurizing the autoclave as rapidly as possible, preferably in less than about 15 to 20 seconds.

3. Exposing the air dried green shell to the steam for about 10 to 15 minutes.

4. Slowing depressurizing the autoclave over about 30 to 60 seconds.

Flash dewaxing may be performed by plunging the air dried green shell mold into a furnace heated to about 1000° F. to about 1900° F. At these temperatures, the wax next to the wall of the ceramic shell rapidly melts so that the pressure due to expansion of the wax does not crack the ceramic shell. The ceramic shell may then be removed to a cooler temperature zone of about 200° F. to 600° F. to complete the removal of the wax. The melted wax can drain through a bottom opening in the melting chamber into a water bath or reservoir for recovery.

Furnacing

Furnacing entails heating the dewaxed ceramic shell mold to about 1600° F. to about 2000° F. to remove volatile residues and to produce a high strength, fired ceramic shell mold. The dewaxed ceramic shell mold is held in the furnace to attain thermal equilibrium, after which it is retrieved from the furnace and cast with the desired molten metal.

Manufacture of ceramic shell molds is illustrated below by reference to the following non-limiting examples:

EXAMPLE 9

An 8 inch by ⅞ inch by ⅜ inch wax bar preform 1 as shown in FIG. 1 is dipped into the refractory slurry of example 1. For convenience, in this example, the same refractory slurry is used for both prime and backup coats.

Wax preform 1 is dipped into the refractory slurry for 8 seconds, removed, and allowed to drain for 10 seconds to form a first prime coat. Zircon sand that has a particle size range of −70 to 140 mesh available from DuPont Corp. is applied as stucco to the first prime coat. The resulting, stuccoed, prime coated wax preform is dried for 30 minutes at 75° F., and then again dipped into the refractory slurry for 8 seconds to form a second prime coat and again stuccoed with the zircon sand of −70 to 140 mesh.

Wax preform 1 having two stuccoed prime coats then is dipped into the refractory slurry for eight seconds and drained for ten seconds. The coated product is stuccoed with Tecosil −50+100 mesh fused silica available from C-E Minerals to form an intermediate stuccoed preform. The intermediate stuccoed preform then is dried for 30 minutes at 75° F. The intermediate stuccoed preform is dipped into the refractory slurry and stuccoed with Tecosil −30+50 mesh fused silica to form stuccoed backup coat. The stuccoed, backup coated preform then is dried at 75° F. This cycle of dipping, draining, stuccoing, and drying is repeated to provide a total of five backup coats.

Figure 2:
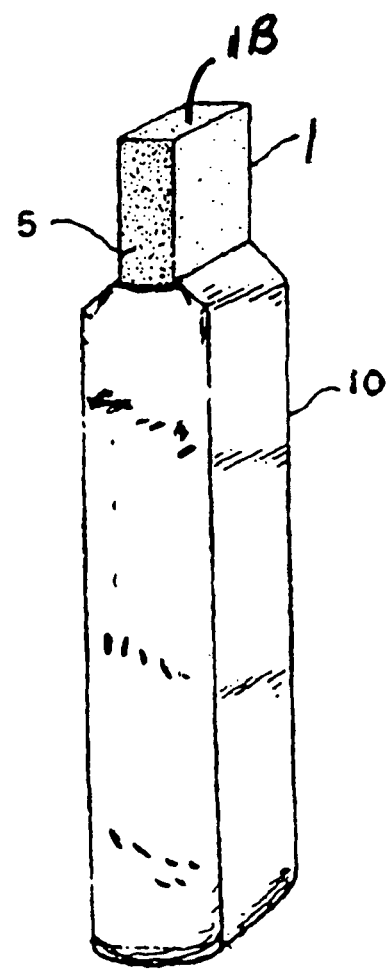
FIG. 2 is an isometric view of a green shell 10 prior to removal of preform 1.
Figure 3:
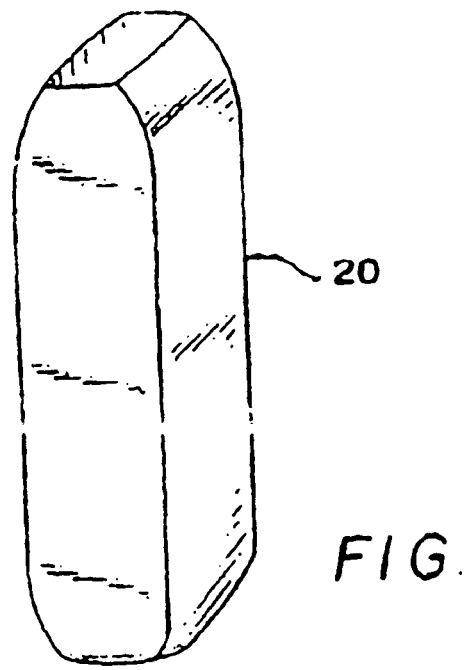
FIG. 3 is an isometric view of a dewaxed, dried green ceramic shell 20.

After each application of prime, intermediate and backup coat, portions of vertical sides 5 and lateral sides 1B of preform 1 are scraped to remove the coats and the stucco to produce a ceramic shell mold 10 as shown in FIG. 2. The ceramic shell mold 10 again is dipped into the refractory slurry to provide a seal coating on the preform. The seal coated, ceramic shell mold 10 is dried at 75° F. overnight. The resulting dried, ceramic shell produced is immersed in boiling water to remove preform 1. The resulting dewaxed, dried, green ceramic shell 20, shown in FIG. 3, is cut in half lengthwise, and dried at 75° F. for 4 hours.

A section of ceramic shell 20 that measures 1 inch wide by 6 inches long by 0.3 inches thick is evaluated for strength by loading a 2 inch span of the section to failure in flexure to determine the modulus of rupture. The modulus of rupture ("MOR") of the ceramic shell is calculated using the formula:

| | |
|---|---|
| | $R = (3WI)/(2bd^2)$ where: |
| R= | modulus of rupture in lbs/in$^2$ |
| W= | load in pounds at which the specimen failed |
| I= | distance (span) in inches between the center-lines of the lower bearing edges |
| b= | width of specimen in inches |
| d= | depth of specimen in inches |

The modulus of rupture for the green shell is 1,018 PSI. The green shell is fired at 1850° F. for one hour. The modulus of rupture of the resulting fired shell mold is 1044 PSI.

EXAMPLE 10

The process of example 9 is repeated except that the slurry of example 8 is employed. The modulus of rupture for the green shell is 688 PSI. The green shell is fired at 1850° F. for one hour. The modulus of rupture of the resulting fired shell mold is 941 PSI.

EXAMPLE 11

The process of example 9 is repeated except that the slurry of example 8A is employed. The modulus of rupture for the green shell mold is 645 PSI. The shell mold is fired at 1850° F. for one hour. The modulus of rupture of the resulting fired mold is 694 PSI.

In another aspect of the invention, refractory slurry that includes rice hull ash is employed. Preferably, the rice hull ash is about 95+% amorphous silica, remainder carbon. This type of rice hull ash is available from Agrilectric Power, Inc., Houston, Tex. MegaPrime silica sol binder, available from Buntrock Industries, Inc. is employed. Use of rice hull ash with dry blends of refractory materials is illustrated in the following non-limiting examples:

EXAMPLE 12

The process of example 9 is repeated except that the refractory slurry used includes 1000 grams MegaPrime silica sol binder that has a pH of 10.5, a solids content of 40%, a titratable Na$_2$O content of 0.33%, an average particle size of about 40 nm, a particle size distribution of about 6 nm to about 190 nm, and a standard deviation of particle size of about 20 nm, and the dry blend is 1430 gram of fused Silica 200 ceramic filler. The MOR of the green shell is 621 PSI.

EXAMPLE 13

The process of example 9 is repeated except that the refractory slurry used includes 1000 grams of the MegaPrime silica sol binder of example 12, and the dry blend is 1430 gram of fused Silica 200 ceramic filler, and 200 grams of rice hull ash. The MOR of the green shell is 804 PSI.

EXAMPLE 14

The process of example 9 is repeated except that the refractory slurry used includes 1000 grams MegaPrime silica sol binder of example 12, and the dry blend is 1430 gram fused Silica 200, 200 grams of rice hull ash, and 16 grams of 731 ED ⅛" milled E-glass fiber. The MOR of the green shell mold is 833 PSI.

EXAMPLE 15

The process of example 9 is repeated except that the refractory slurry used includes 1000 grams of the MegaPrime silica sol binder of example 12, the dry blend is 1430 gram fused Silica 200, 100 grams of rice hull ash, and 16 grams of 731 ED ⅛" milled E-glass fiber, and 4 grams Chop Vantage 8610 chopped ⅛" E-glass fiber. The MOR of the green shell is 1161 PSI.

EXAMPLE 16

The process of example 9 is repeated except that the refractory slurry used includes 1000 grams Megasol silica sol binder that has a pH of 9.5, a solids content of 45% and a titratable Na$_2$O content of 0.2%, and the dry blend is 1300 grams of fused Silica 200 and 100 grams rice hull ash. The MOR of the green shell is 831 PSI.

EXAMPLE 17

The process of example 9 is repeated except that the refractory slurry used includes 875 grams of the MegaPrime sol binder of example 12, and the dry blend is 1485 grams fused Silica 120, 100 grams rice hull ash and 100 grams of polyethylene fiber that has a length of 1 mm and a diameter of 0.5 micron.

EXAMPLE 18

The process of example 9 is repeated except that the refractory slurry used includes 1000 grams MegaPrime silica sol binder that has a pH of 10.5, a solids content of 40%, a titratable Na$_2$O content of 0.33%, an average particle size of about 40 nm, a particle size distribution of about 6 nm to about 190 nm, and a standard deviation of particle size of about 20 nm, and the dry blend of 1430 gram of fused Silica 200 ceramic filler and 100 grams rice hull ash.

EXAMPLE 19

The process of example 9 is repeated except that the refractory slurry used includes 1000 grams MegaPrime silica sol binder that has a pH of 10.5, a solids content of 40%, a titratable Na$_2$O content of 0.33%, an average particle size of about 40 nm, a particle size distribution of about 6 nm to about 190 nm, and a standard deviation of particle size of about 20 nm, and the dry blend is 1430 gram of ceramic filler that includes 50% 325 mesh fused silica, 25% 120 mesh fused silica, and 25% 50 mesh fused silica.

EXAMPLE 20

The process of example 19 is repeated except that 100 grams of rice hull ash also is included in the dry blend used to prepare the refractory slurry.

EXAMPLE 21

The process of example 9 is repeated except that the refractory slurry used includes 1000 grams Megasol® silica sol binder that has a solids content of 45%, a pH of 9.5 and a titratable Na$_2$O content of 0.2%, an average particle size of about 40 nm, a particle size distribution of about 6 nm to about 190 nm, and a standard deviation of particle size of about 20 nm, and the dry blend is a mixture of 100 gm ceramic fiber and 1400 gm ceramic filler. The ceramic fiber is Wollastonite One fiber. The ceramic filler includes 700 gram fused silica 120, 700 gram fused silica 200, 100 gram Mullite 100 Mesh. The MOR is 910 PSI.

EXAMPLE 22

The process of example 21 is repeated except that 100 grams of rice hull ash also is included in the dry blend used to prepare the refractory slurry.

EXAMPLE 23

This example illustrates manufacture of ceramic shell molds without the use of stucco.

An 8 inch by ⅞ inch by ⅜ inch wax bar preform 1 as shown in FIG. 1 is dipped into a refractory slurry that includes 1000 grams of the Megasol used in example 1, and a dry blend of 2135 grams ceramic filler and 213 grams Wollastonite refractory fiber. The ceramic filler includes 1485 grams 200 mesh fused silica, 250 grams 35 mesh mullite, and 400 grams 48 mesh mullite. In this example, the same refractory slurry is used for both prime and backup coats.

Wax preform 1 is dipped into the refractory slurry for 8 seconds, removed, and allowed to drain for 10 seconds to form a first prime coat. The prime coated wax preform is dried for 30 minutes at 75° F., and then again dipped into the refractory slurry for 8 seconds to form a second prime coat.

Wax preform 1 having two prime coats then is dipped into the refractory slurry for eight seconds and drained for ten seconds. The coated preform then is dried for 30 minutes at 75° F. This cycle of dipping, draining and drying is repeated to provide a total of five backup coats.

After application of each prime coat and backup coat, portions of vertical sides 5 and lateral sides 1B of preform 1 are scraped to remove the coats to produce a ceramic shell mold 10 as shown in FIG. 2. The ceramic shell mold 10 then is dipped into the refractory slurry to provide a seal coating on the preform. The seal coated, ceramic shell mold 10 is dried at 75° F. overnight. The resulting dried, ceramic shell produced is immersed in boiling water to remove preform 1 to produce a dewaxed, dried, green ceramic shell. The green shell mold then is fired at 1850° F. to produce a fired ceramic shell mold.

EXAMPLE 24

The procedure of example 23 is repeated except that the dry blend includes 213 grams of E-glass fiber.

EXAMPLE 25

The procedure of example 23 is repeated except that the dry blend includes 100 grams of rice hull ash.

EXAMPLE 26

The procedure of example 24 is repeated except that the dry blend includes 100 grams rice hull ash.

In Examples 27–32 ceramic shells are formed by applying a prime coat which does not have fibers onto an expendable wax preform. Subsequent prime coat(s) and/or backup coats, each of which are formed by admixing a dry blend that includes fibers and filler with colloidal sol, then are applied to the preform to produce a ceramic coated preform.

The wax preform employed is in the shape of an equilateral, triangular bar that measures 1.25 inches per side, 8 inches long, and has a radius of curvature of 0.070 inches on each corner. The triangular wax preform is available from Buntrock Industries, Inc. Prior to use, the wax preform typically is treated by cleaning it with a solvent such as trichloroethane and alcohol (about a 50:50 blend), Freon, acetone, methyl ethyl keytone, water based detergent solution or a water emulsion containing d-limonene. An especially good method of preparing the wax preform is to treat it with a colloidal alumina suspension as found in Pattern Wetting Solution from Buntrock Industries, Inc.

A shell is prepared by dipping the treated, triangular wax preform into prime coat slurry, stuccoing, drying, dipping into a backup coat slurry, stuccoing and drying. The wax preform then is melted out to produce a green ceramic shell. The thicknesses of the center and of the corners of the shell are measured and compared to assess uniformity. Measurements show that the thickness of each of the corners of the shell is increased and that the uniformity of the shell is significantly improved by utilizing slurries produced from dry blends which include fibers. The use of these slurries also achieves superior material utilization and minimizes crack formation at high stress points such as the corners of the shell.

EXAMPLE 27

This example shows use of a prime coat slurry formed by mixing a blend of ceramic fillers with a colloidal silica sol, and a backup coat slurry formed by mixing a blend of a ceramic fillers and nylon fiber with a colloidal silica sol A prime coat slurry is formed by mixing 75 parts of a dry blend of two ceramic fillers with 25 parts Nyacol 830 colloidal silica sol (available from Eka Chemical) that is diluted with water to a 25% silica concentration. Nyacol 830 has 30 wt. % silica particles of an average diameter of 10 micron. The pH of the slurry is 10.5 and has a viscosity at 25° C. of 8 cps. The density of the sol is 10 LBS/gal., and has a $Na_2O$ content of 0.55 wt. %. The dry blend includes 20 parts fused silica 200f and 80 parts zircon 325 mesh. The viscosity of the slurry is adjusted to 20 seconds on a #5 Zahn cup by addition of water.

Backup coat slurry is prepared by mixing 825 parts BI-2010 and 550 parts TMM-30. BI-2010 from Buntrock Industries, Inc. is a dry blend that includes fused silica and rice hull ash together with nylon fiber. TMM-30 is a 30% colloidal silica sol available from Buntrock Industries, Inc. The backup coat slurry is diluted with water to a viscosity of 17 seconds on a #5 Zahn cup.

A triangular wax preform, treated as described above, is dipped into the prime coat slurry, stuccoed with 115 AFS zircon sand, and air dried at room temperature for 2 hr. to from a prime coated-stuccoed preform. The prime coated-stuccoed preform is dipped into the backup slurry, stuccoed with −30+50 mesh fused silica (available from CE Minerals, Inc.), and air dried at room temperature for 4 hr. This step is repeated two additional times to produce a total of three stuccoed-backup coats. The resulting stuccoed, backup coated wax preform is seal coated by dipping it once into the backup slurry, and air drying at room temperature for 8 hr.

The preform is heated to 200° F. to remove the wax preform to yield a green shell. Shell thickness and uniformity are measured. The average shell thickness of the green shell was 0.368 inches on centers and 0.316 inches on corners for uniformity of 85.9%.

EXAMPLE 27A

This example shows use of a prime coat slurry formed by mixing a ceramic filler with a colloidal silica sol, and a backup coat slurry formed by mixing a blend of ceramic fillers and nylon fiber with a colloidal silica sol The method of example 27 is followed except that 65 parts fused silica is substituted for the 75 parts of the dry blend of ceramic fillers and then mixed with the 25 parts Nyacol 830 in the prime coat slurry.

EXAMPLE 28

This example shows use of prime coat slurry formed by mixing a blend of ceramic fillers with a colloidal silica sol, and a backup coat slurry formed by mixing a blend of ceramic fillers and nylon fiber with a colloidal silica sol modified by latex The procedure of example 27 is followed except that five stuccoed-backup coats are applied. Each backup coat is formed by using a backup slurry that includes 15 parts of the BI-2010 dry blend employed in example 27, and 10 parts of TMM 30 silica sol that is modified by addition of 6 wt. % QDA latex polymer based on the weight of the TMM 30 sol. QDA latex polymer is available from Buntrock Industries, Inc. The backup slurry has a viscosity of 15–16 seconds on a Zahn #5 cup.

The stuccoed, backup coated preform is heated to 200° F. to remove the wax preform to form a green shell. Shell thickness and uniformity are measured. Average shell build on centers is 0.404 inches and 0.311 inches on corners for a uniformity of 77.0%.

EXAMPLE 29

This example shows use of a prime coat slurry formed by mixing a blend of ceramic fillers with a colloidal silica sol, and a backup coat slurry formed by mixing a blend of ceramic fillers and polypropylene fiber with a colloidal silica sol The procedure of example 27 is used except that the backup slurry is formed by substituting Gray Matter from Ondeo Nalco for the BI-2010 dry blend. Gray Matter is a dry blend of fused silica, fumed silica and polypropylene fibers which have an average length of 3.2 mm. The viscosity of the backup slurry is 15–16 seconds on a Zahn #5 cup. The coated preform is heated to 200° F. to remove the wax preform to form a green shell. The average shell thickness on centers is 0.374 inches and 0.286 inches on corners for uniformity of 76.5%.

EXAMPLE 30

This example shows use of a prime coat slurry formed by mixing a blend of ceramic fillers with a colloidal silica sol, and a backup coat slurry formed by mixing a blend of a plurality of ceramic fillers and polypropylene fiber with a colloidal silica sol Prime coat slurry is prepared by mixing 35 parts of a first dry blend of ceramic fillers with 10 parts Nyacol 1430 colloidal silica sol from Eka Chemical. The first dry blend of ceramic fillers includes 75 parts zircon (−325 mesh), and 25 parts fused silica 200f. The viscosity of the prime coat slurry is adjusted with water to 24 seconds on a #5 Zahn cup.

A backup coat slurry is prepared by mixing 24 parts of a second dry blend with 10 parts Nyacol 830 colloidal silica sol to produce backup coat slurry. The second dry blend includes 1 wt. % of 3.3 mm length polypropylene fibers, 60 wt. % fused silica 120f, 35% fused silica 200f and 4 wt. % fumed silica (available from CE Minerals, Inc.)., all amounts based on total weight of the second dry blend. The backup coat slurry is diluted with water to achieve a silica concentration of 25% and a viscosity of 16 seconds on a #5 Zahn cup. Shells are prepared as in example 27.

EXAMPLE 31

This example shows use of a prime coat slurry formed from a single ceramic filler and a colloidal silica sol, and a backup coat slurry formed from a blend of ceramic fillers and nylon fiber with a colloidal silica sol Prime coat slurry is prepared using 80 wt. % −200 mesh zircon flour (Continental Minerals) and 20 wt. % Nyacol 830. A wax preform prepared as in example 27 is dipped into the prime coat slurry, stuccoed with 115 AFS zircon sand (Continental minerals), and air dried. A backup coat slurry is prepared from 10 parts TMM30 and 15 parts BI 2010 dry blend. The dried, stuccoed, prime coated preform is dipped into the backup coat slurry, stuccoed with SS30 fused silica (available from Buntrock Industries, Inc) and air dried to produce a stuccoed, backup coated preform. This step is repeated four additional times to produce a preform that has five stuccoed, backup coats.

The resulting stuccoed preform is seal coated by dipping it once into the backup coat slurry. The stuccoed preform is heated to 200° F. to remove the wax preform to form a green shell. Average shell build on centers is 0.528 inches and 0.482 inches on corners for uniformity of 91.3%.

EXAMPLE 31A

This example shows use of a prime coat slurry formed from a single ceramic filler and a colloidal silica sol, and a backup coat slurry formed from a blend of ceramic fillers and nylon fiber with a colloidal silica sol modified with latex The procedure of example 31 is followed except that TMM 30 silica sol that is modified by addition of 6 wt. % QDA latex polymer is substituted for the TMM 30 silica sol.

EXAMPLE 32

This example shows use of a prime coat slurry formed from a single ceramic filler with a colloidal silica sol, and a backup coat slurry formed from a blend of ceramic fillers and nylon fiber with a colloidal silica sol Prime coat slurry is prepared by mixing 78 parts −325 mesh zircon flour (available from Continental Minerals) and 20 parts TMM30 silica sol to achieve a viscosity of 22 seconds on a #5 Zahn cup. Backup slurry is prepared from 150 parts BI 2010 and 100 parts TMM30. The backup coat slurry has a viscosity of 15 seconds on a #5 Zahn cup.

A triangular wax preform as in example 27 is dipped into the prime coat slurry, stuccoed with 110 to 125 AFS zircon sand and air dried to produce a prime coated, stuccoed preform. The prime coated, stuccoed preform is again dipped into the prime coat slurry, stuccoed with −50+100 fused silica (CE Minerals) and air dried. The resulting stuccoed preform is dipped into the backup coat slurry, stuccoed with SS-30 fused silica (Buntrock Industries, Inc.), and air dried. This step is repeated two additional times to produce a preform that has a total of three stuccoed, backup coats. The preform is heated to 200° F. to remove the wax preform to form a green shell. Shell build is 0.372 inches on centers and 0.307 inches on corners for uniformity of 82.5%.

Examples 33 and 34 are comparative examples which show use of prime coat slurries and backup coat slurries which include ceramic filler but without fiber.

EXAMPLE 33

This example shows use of a prime coat slurry formed by mixing a single ceramic filler with a colloidal silica sol, and a backup coat slurry formed by mixing a blend of a plurality of ceramic fillers and colloidal silica sol Shell specimens are prepared as in example 31, except that the backup slurry is formed by mixing a dry blend of 490 parts 120f fused silica and 1122 parts 200f fused silica (CE Minerals) with 790 parts Nyacol 830 and 98 parts water, and also that the stucco applied to the backup coat is –30+50 fused silica (CE Minerals). The preform is heated to 200° F. to remove the wax preform to form a green shell. Average shell build on centers was 0.418 inches and 0.327 on corners for a uniformity of 78.2%.

EXAMPLE 34

This example shows use of a prime coat slurry formed by mixing a single ceramic filler and a colloidal silica sol, and a backup coat slurry formed by mixing a single ceramic filler and colloidal silica sol Shell specimens are prepared as in example 31, except that the backup slurry is prepared from 70 parts fused silica 200f (CE Minerals) and 30 parts Nyacol 830, and that each backup coat is stuccoed with –30+50 fused silica (CE Minerals). A total of four stuccoed backup coats are applied, as well as a seal coat. The seal coat employs the backup slurry. The preform is heated to 200° F. to remove the wax preform to form a green shell. Shell build is 0.285 on centers and 0.229 on corners for a uniformity of 80.5%.

Examples 35–41 show the versatility of slurries formed from dry fiber blends in shell construction. In examples 35–37, dry blends 1 to 4 and Slurries AA to DD are employed.

Dry blend No. 1 is prepared by mixing 0.5 wt. % Wex nylon fibers which have an average length of 0.5 mm., 50 wt. % fused silica 200f (available from CE Minerals), and 49.5 wt. % zircon 325 mesh (available from Continental Minerals, Inc.), all amounts based on the total weight of the blend. Slurry AA is formed by mixing 75 parts dry blend No. 1 with 30 parts Nyacol 830 where the Nyacol 830 is diluted with water to achieve a silica concentration of 25%. The viscosity of slurry AA is adjusted with water to 22 seconds on a Zahn #5 cup.

Dry blend no. 2 is prepared by mixing a blend of 50 wt. % fused silica 200f (available from CE Minerals), and 50 wt. % zircon 325 mesh (available from Continental Minerals, Inc.), all amounts based on the total weight of the blend. Slurry BB is prepared in the same manner as described above with Slurry AA except that dry blend 2 is substituted for dry blend 1. The viscosity of Slurry BB is adjusted to 22 seconds on a number Zahn #5 cup by addition of water.

Dry blend no. 3 is BI-2010 (available from Buntrock Industries, Inc.). Slurry CC is prepared using 15 parts of BI-2010 and 10 parts TMM-30 colloidal silica binder. The viscosity of slurry CC is adjusted to 16 seconds on a Zahn #5 cup by addition of water.

Dry blend no. 4 is prepared by mixing 1 wt. % Wex nylon fiber that measures 1.6 mm long and 99 wt. % Mulgrain M60 200ICC (available from CE Minerals, Inc.), all amounts based on the total weight of the blend. Slurry DD is made with 40 parts Megasol (available from Buntrock Industries) and 60 parts dry blend no. 4. Slurry DD is adjusted to a viscosity of 14 seconds on a Zahn #5 cup by addition of water.

EXAMPLE 35

This example shows use of a prime coat slurry formed by mixing a blend of ceramic fillers and nylon fiber with colloidal silica sol, as well as a backup coat slurry formed by mixing a blend of ceramic fillers and nylon fiber with colloidal silica sol A triangular wax preform as in example 31 is dipped into a Pattern Wetting Solution (Buntrock Industries) that contains colloidal alumina and wetting agent. The resulting treated preform is dipped once into slurry AA, stuccoed with zircon sand and air dried to form a prime coated, stuccoed preform. The prime coated preform again is dipped into slurry AA, stuccoed with SS-30 fused silica to produce a stuccoed, backup coated preform, and then air dried. This step is repeated three times to produce a total of four stuccoed, backup coats. The stuccoed preform is heated to 200° F. to remove the wax preform to form a green shell.

EXAMPLE 36

This example shows use of a first prime coat slurry formed by mixing a blend of ceramic fillers with colloidal silica sol, a second prime coat slurry formed by mixing a blend of ceramic fillers and nylon fiber with colloidal silica sol, and a backup coat slurry formed by mixing a blend of a single ceramic filler and nylon fiber with colloidal silica sol A wax preform is prepared as in example 35, coated with the Pattern Wetting Solution and air dried. The wax preform is dipped into Slurry BB, and stuccoed with zircon sand and air dried to form a first prime coat, stuccoed preform. The prime coat, stuccoed preform then is dipped into Slurry CC, stuccoed with –50+100 fused silica and air dried to produce a bilayer, prime coat, stuccoed preform. The bilayer, stuccoed preform is dipped into slurry DD, and stuccoed with Mulgrain M47 22S (available from CE Minerals, Inc.) and air dried to produce a stuccoed, backup coated preform. This step is repeated twice to produce a preform that has a total of three backup, stuccoed coats. The preform is heated to 200° F. to remove the wax preform to form a green shell.

EXAMPLE 36A

This example shows use of a first prime coat slurry formed by mixing a blend of ceramic fillers with colloidal silica sol, a second prime coat slurry formed by mixing a blend of ceramic filler and ceramic fiber with colloidal silica sol, and a backup coat slurry formed by mixing a blend of ceramic filler and ceramic fiber with colloidal silica sol The process of example 36 is followed except that Wollastonite ceramic fiber is substituted for nylon in each of blends 3 and 4 for use in slurry CC applied as a second prime coat and slurry DD applied as a backup coat.

EXAMPLE 37

This example shows use of a prime coat formed by mixing a blend of ceramic fillers with colloidal silica sol and a backup coat slurry formed by mixing a blend of a ceramic fillers and nylon fiber with colloidal silica sol A triangular wax preform as in example 35 is treated with Pattern Wetting Solution and air dried as in example 35. The preform is dipped into slurry BB, stuccoed with Mulgrain M47 105AFS (available from CE Minerals, Inc.) and air dried to produce a stuccoed, prime coated preform. The stuccoed, prime coated preform is dipped into slurry CC, stuccoed with Mulgrain M47 22S and air dried to produce a stuccoed backup coated preform. This step is repeated three times to produce a preform that has four stuccoed, backup coats. The preform is heated to 200° F. to remove the wax preform to form a green shell.

EXAMPLE 38

This example shows use of a first prime coat formed by mixing a blend of ceramic fillers with colloidal silica sol, a second prime coat formed by mixing a blend of ceramic fillers with colloidal silica sol having a latex modifier, and a backup slurry formed by mixing a blend of ceramic fillers with colloidal silica sol having a latex modifier. This example shows the difference in shell construction and breaking load when slurries are employed which do not include fiber.

A wax bar measuring 8 inches long by 1.25 inches wide by 0.25 inches thick is dipped in Pattern Wetting Solution from Buntrock Industries. The resultant, treated wax bar is air dried to produce a coated bar bearing a hydrophilic film of dried colloidal alumina. The bar then is dipped into a first prime coat slurry formed by mixing 2000 gms of a blend that includes 75 wt. % zircon 200 and 25 wt. % fused silica 120f with 625 gms Nyacol 830. The viscosity of this first prime coat slurry is 20 seconds on a #4 Zahn cup. The bar bearing the first prime coat then is air-dried.

The air dried bar is wetted with TMM 30 silica sol diluted with water to 15% concentration prior to application of second prime coat slurry. The resulting, pre-wetted bar, without drying, is dipped into a second slurry that is formed by mixing a 50:50 blend of 120f fused silica and 200 f fused silica with TMM-30 aqueous silica sol that has been modified to include 10 wt. % latex polymer, based on the TMM-30 sol. The second prime coat slurry has a viscosity of 15 seconds on a BI#5 cup. The BI#5 cup is available from Buntrock Industries.

The second prime coat is stuccoed with Zircon sand to form a stuccoed, prime coated bar and air dried. The dried, stuccoed, prime coated bar again is dipped into the second slurry and then stuccoed with −30+50 fused silica (CE Minerals) and air dried to produce a stuccoed backup coated bar. This step is repeated three times to produce a bar that bears four stuccoed backup coats. A seal coat is applied by dipping the resulting bar into the second slurry and then air-drying without applying stucco.

Using this procedure, two stuccoed bars are produced. Each bar is air dried, and then heated to 200° F. to melt out the wax to produce green ceramic shells. The shell thickness on the first bar is 0.229", and the shell thickness on the second bar is 0.244". Each shell measures 6.5 inches long and 1.25 inches wide. The first shell is evaluated for dry green breaking load and MOR as described above. The first shell has a dry green breaking load of 16.23 LB, and a dry green MOR of 733 PSI.

The second shell is soaked for two minutes in boiling water and then removed. This second shell, while hot and moist, is tested using the procedures described above to obtain breaking load and MOR. The breaking load for the hot, moist second shell is 4.74 LB, and its MOR is 189 PSI.

EXAMPLE 39

This example shows use of a first prime coat slurry formed by mixing a blend of a ceramic fillers with colloidal silica sol, a second prime coat slurry formed by mixing a blend of ceramic fillers and polypropylene fiber with a colloidal silica sol having a latex modifier, and a backup coat slurry formed by mixing a blend of ceramic fillers and polypropylene fiber with a colloidal silica sol having a latex modifier The procedure of example 38 is followed except that Gray Matter dry blend from Ondeo Nalco is substituted for the 50:50 blend of 120f fused silica and 200f fused silica used to form the second slurry. The second slurry has a viscosity of 15 seconds on a BI #5 cup. Gray Matter dry blend includes fused silica, fumed silica, and polypropylene fiber. A first shell of 0.263" thickness and a second shell of 0.260" thickness are produced. The first shell has a dry green breaking load of 13.60 LB and a dry green MOR of 478 PSI. The second shell, after having been soaked in boiling water for two minutes, is tested as above to determine breaking load and MOR. The shell has a hot, moist breaking load of 6.64 LB and a hot, moist MOR of 239 PSI.

EXAMPLE 40

This example shows use of a first prime coat slurry formed by mixing a blend of ceramic fillers with colloidal silica sol, a second prime coat slurry formed by mixing a blend of ceramic fillers and nylon fiber with a colloidal silica sol, and a backup coat slurry formed by mixing a blend of ceramic fillers and nylon fiber with a colloidal silica sol.

The procedure of example 38 is followed except that in the second slurry, BI-2010 dry blend available from Buntrock Industries is substituted for the 50:50 blend of 120f fused silica and 200f fused silica and TMM-30 silica sol is substituted for the TMM-30 silica sol modified by latex. The second slurry has a viscosity of 15 seconds on a BI #5 cup. A first shell of 0.332" thickness and a second shell of 0.370" thickness are produced. The first shell has a dry green breaking load of 20.61 LB and a dry green MOR of 443 PSI. The second shell, after having been soaked in boiling water for two minutes, has a hot, moist breaking load of 13.24 LB and a hot, moist MOR of 230 PSI.

EXAMPLE 41

This example shows use of a first prime coat slurry formed by mixing a blend of ceramic fillers with colloidal silica sol, a second prime coat slurry formed by mixing a blend of ceramic fillers and nylon fiber with a colloidal silica sol, and a backup coat slurry formed by mixing a blend of ceramic filler and polypropylene fiber with a colloidal silica sol Following the procedure of example 38, a first prime coat is applied to the wax bar, air-dried, and then wetted with the diluted TMM-30 silica sol. Before drying, a second prime coat is applied to the bar by dipping it into the second slurry used in example 40 and air dried. The resulting prime coated bar then is dipped into a backup coat slurry formed from Gray Matter dry blend and TMM 30 colloidal silica sol. The backup coat slurry has a viscosity of 15 seconds on a BI #5 cup. The backup coated bar is then stuccoed with −30+50 fused silica (CE Minerals) and air dried to produce a stuccoed, backup coated bar. This step is repeated three times to produce a bar that bears four stuccoed backup coats.

A final seal coat is applied by dipping the bar into the backup coat slurry and air dried without applying stucco.

Using this procedure, two stuccoed bars are produced. Each bar is air dried, and then de-waxed as Example 38. The shell thickness on the first bar is 0.287", and the shell thickness on the second bar is 0.288". The first shell has a dry green breaking load of 18.68 lb., and a dry green MOR of 547 PSI. The second shell, after having been soaked in boiling water for two minutes, has a hot, moist breaking load of 8.91 lb., and a hot moist MOR of 261 PSI.

EXAMPLE 42

This example shows use of prime coat slurry formed by mixing a blend of ceramic filler and ceramic fiber with colloidal silica sol and a backup coat slurry formed by mixing a blend of ceramic filler and ceramic fiber with a colloidal silica sol A triangular wax preform as in example 35 is dipped once into a slurry that is formed by mixing a 20 parts of a blend of 98% fused silica ceramic filler and 2% Wollastonite ceramic fiber with 12 parts TMM 30 sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stuccoed, backup coats. The stuccoed preform then is heated to 200° F. to remove the wax preform to form a green shell.

EXAMPLE 43

This example shows use of a prime coat formed by mixing a blend of a ceramic filler and ceramic fibers with colloidal silica sol and a backup coat formed by mixing a blend of a ceramic filler and a plurality of ceramic fibers with colloidal silica sol A triangular wax preform as in example 35 is dipped once into a slurry that is formed by mixing 24 parts of a blend formed of 97 parts of fused silica ceramic filler and 3 parts of a mixture formed of 50 parts Kaowool ceramic fiber and 50 parts SAFIL ceramic fiber, with 10 parts Nyacol 830 silica sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stuccoed, backup coats. The stuccoed preform then is heated to 200° F. to remove the wax preform to form a green shell.

EXAMPLE 44

This example shows use of a prime coat formed by mixing a blend of ceramic fillers and polypropylene fiber with colloidal silica sol and a backup coat formed by mixing a blend of ceramic fillers and polypropylene fiber with colloidal silica sol A triangular wax preform as in example 35 is dipped once into a slurry that is formed by mixing 28 parts of a blend formed of 50 parts of Zircon ceramic filler and 50 parts of a mixture formed of 96 parts fused silica and 4 parts polypropylene fiber, with 10 parts Nalcoag 1130 silica sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stuccoed, backup coats. The stuccoed preform then is heated to 200° F. to remove the wax preform to form a green shell.

EXAMPLE 45

This example shows use of a prime coat formed by mixing a blend of a ceramic filler, ceramic fiber and nylon fiber with silica sol and a backup coat formed by mixing a blend of a ceramic filler, ceramic fiber and nylon fiber with silica sol A triangular wax preform as in example 35 is dipped once into a slurry that is formed by mixing 25 parts of a blend formed of 98 parts of fused silica ceramic filler and 2 parts of a mixture formed of 4 parts Wollastonite ceramic fiber and 1 part nylon fiber, with 10 parts TMM 30 sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stucco, backup coats. The stuccoed preform then is heated to 200° F. to remove the wax preform to form a green shell.

EXAMPLE 46

This example shows use of a prime coat formed of a blend of ceramic fillers and ceramic fiber and a backup coat formed of a blend of ceramic fillers and ceramic fiber A triangular wax preform as in example 35 is dipped once into a slurry that is formed by mixing 30 parts of a blend formed of a mixture of 50 parts zircon ceramic filler, 45 parts fused silica ceramic filler and 5 parts Wollastonite ceramic fiber, with 10 parts Megasol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stucco, backup coats. The stuccoed preform then is heated to 200° F. to remove the wax preform to form a green shell.

EXAMPLE 47

This example shows use of a prime coat slurry formed by mixing a blend of ceramic fillers and ceramic fibers with colloidal silica sol and a backup coat formed by mixing a blend of ceramic fillers and of ceramic fibers with colloidal silica sol A triangular wax preform as in example 35 is dipped once into a slurry that is formed by mixing 29 parts of a blend formed of a mixture of 48 parts fused silica ceramic filler and 48 parts Mulgrain ceramic filler with 4 parts of a mixture of 30 parts Kaowool ceramic fiber and 70 parts Mineral wool ceramic fiber, with 10 parts TMM 30 sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stuccoed, backup coats. The stuccoed preform then is heated to 200° F. to remove the wax preform to form a green shell.

EXAMPLE 48

This example shows use of a prime coat slurry formed by mixing a blend of ceramic fillers with polypropylene fiber with colloidal silica sol and a backup coat by mixing a blend of ceramic fillers with polypropylene fiber with colloidal silica sol A triangular wax preform as in example 35 is dipped once into slurry that is formed by mixing 32 parts of a blend of a mixture of 33 parts fused silica ceramic filler and 33 parts Mulgrain ceramic filler, and 34 parts of a mixture of 90 parts Kyanite ceramic filler and 10 parts polypropylene fiber, with 10 parts Megasol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stucco, backup coats. The stuccoed preform then is heated to 200° F. to remove the wax preform to form a green shell.

EXAMPLE 49

This example shows use of a prime coat slurry formed by mixing a blend of ceramic fillers with nylon fiber with colloidal silica sol and a backup coat by mixing a blend of ceramic fillers and nylon fiber with colloidal silica sol.

A triangular wax preform as in example 35 is dipped once into a slurry that is formed by mixing 35 parts of a blend formed of a mixture of 75 parts of Zircon ceramic filler and 20 parts tabular alumina ceramic filler, and 5 parts of a mixture of 2 parts Safil ceramic fiber and 2 parts nylon fiber, with 10 parts TMM 30 sol. The resulting coated preform is stuccoed with zircon sand and air dried to form a prime coated, stuccoed preform. The prime coated preform again is dipped into the slurry, stuccoed with SS-30 fused silica to produce a stuccoed, backup coated preform, and then air dried. This step is repeated three times to produce a total of four stuccoed, backup coats. The stuccoed preform then is heated to 200° F. to remove the wax preform to form a green shell.

The invention claimed is:

1. A method of manufacture of an investment casting mold comprising,
    mixing one or more fibers selected from the group consisting of organic fiber, ceramic fiber and mixtures thereof with one or more ceramic fillers to form a first dry blend,
    mixing fiber and ceramic filler to form a second dry blend which is the same or different from the first dry blend,
    mixing the first dry blend with a first colloidal sol to form prime coat slurry,
    mixing the second dry blend with a second colloidal sol to form a backup coat slurry wherein the second colloidal silica sol is the same or different from the first colloidal silica sol and wherein the backup coat slurry is the same or different from the prime coat slurry,
    applying a coating of the prime coat slurry onto an expendable preform to produce a prime coated preform,
    applying stucco onto the prime coated preform,
    drying the stuccoed, prime coated preform,
    applying a coating of the backup coat slurry onto the stuccoed, prime coated preform to produce a backup coated preform,
    applying stucco onto the backup coated preform to produce a stuccoed, backup coated preform,
    drying the stuccoed, backup coated preform,
    removing the expendable preform from the backup coated preform to produce a green shell mold, and
    heating the green shell mold to a temperature sufficient to produce a fired ceramic shell mold.
2. The method of claim 1 wherein any of the first sol or the second sol is an ionic silicate, colloidal silica sol, colloidal silica sol modified by latex, ethyl silicate, or mixtures thereof.
3. The method of claim 1 wherein any of the first sol or the second sol is colloidal silica sol.
4. The method of claim 1 wherein the fiber in the second dry blend is selected from the group consisting of ceramic fiber, glass fiber, organic fiber, or mixtures thereof.
5. The method of claim 1 the ceramic filler in any one of the first dry blend and the second dry blend includes ceramic grains which have a particle size of about 20 mesh to about 600 mesh.
6. The method of claim 1 the ceramic filler in any one of the first dry blend and the second dry blend includes ceramic grains which have a particle size of about −120 mesh to about −325 mesh.
7. The method of claim 1 the ceramic filler in any one of the first dry blend and the second dry blend includes calcined coke.
8. A method of manufacture of an investment casting mold comprising,
    mixing one or more ceramic fillers with a first colloidal silica sol to produce a first prime coat slurry,
    mixing ceramic filler with organic fiber to form a dry blend wherein the ceramic filler is the same or different from any one of the ceramic fillers in the first prime coat slurry,
    mixing the dry blend with a second colloidal silica sol to form a second prime coat slurry wherein the second colloidal silica sol is the same or different from the first colloidal sol,
    mixing the dry blend with a third colloidal silica sol to produce a backup coat slurry wherein the third colloidal silica sol is the same or different from each of the first colloidal sol and the second colloidal sol,
    applying the first prime coat slurry onto an expendable preform to produce a first prime coated preform,
    applying a stucco onto the first prime coated preform to produce a stuccoed, first prime coated preform,
    drying the stuccoed, first prime coated preform to produce a dried, stuccoed first prime coated preform,
    applying the second prime coat slurry onto the dried, stuccoed first prime coated preform to produce a preform having a plurality of prime coats,
    applying stucco to the preform having a plurality of prime coats to produce a stuccoed preform having a plurality of prime coats,
    drying the stuccoed preform to produce a dried, stuccoed preform having a plurality of prime coats,
    applying the backup coat slurry to the dried, stuccoed preform having a plurality of prime coats to produce a backup coated preform,
    applying stucco onto the backup coated preform to produce a stuccoed, backup coated preform,
    drying the stuccoed, backup coated preform,
    removing the expendable preform from the backup coated preform to produce a green shell mold, and
    heating the green shell mold to a temperature sufficient to produce a fired ceramic shell mold.
9. The method of claim 8 at least one of the colloidal silica sols is modified by latex polymer.

10. A method of manufacture of an investment casting mold comprising,
  mixing one or more ceramic fillers with a first colloidal silica sol to produce a first prime coat slurry,
  mixing a ceramic filler with ceramic fiber to produce a dry blend wherein the ceramic filler is the same or different from any of the ceramic fillers in the first prime coat slurry,
  mixing the dry blend with a second colloidal silica sol to form a backup coat slurry wherein the second colloidal silica sol is the same or different from the first colloidal sol,
  applying the prime coat slurry onto an expendable preform to produce a prime coated preform,
  applying stucco onto the prime coated preform to produce a stuccoed, prime coated preform,
  drying the stuccoed, prime coated preform to produce a dried, stuccoed prime coated preform,
  applying the backup coat slurry to the dried, stuccoed prime coated preform to produce a backup coated preform,
  applying stucco onto the backup coated preform to produce a stuccoed, backup coated preform,
  drying the stuccoed, backup coated preform,
  removing the expendable preform from the backup coated preform to produce a green shell mold, and
  heating the green shell mold to a temperature sufficient to produce a fired ceramic shell mold.

11. The method of claim 10 at least one of the colloidal silica sols is modified by latex polymer.

12. A method of manufacture of an investment casting mold comprising,
  mixing one or more ceramic fillers with a first colloidal silica sol to produce a first prime coat slurry,
  mixing fused silica and polypropylene fiber to form a dry blend,
  mixing the dry blend with a second colloidal silica sol to form a second prime coat slurry wherein the second colloidal silica sol is the same or different from the first colloidal silica sol,
  mixing the dry blend with a third colloidal silica sol to produce a backup coat slurry wherein the third colloidal silica sol is the same or different from each of the first colloidal sol and the second colloidal sol,
  applying the first prime coat slurry onto an expendable preform to produce a first prime coated preform,
  applying stucco onto the first prime coated preform to produce a stuccoed, first prime coated preform,
  drying the stuccoed, first prime coated preform to produce a dried, stuccoed first prime coated preform,
  applying the second prime coat slurry onto the dried, stuccoed first prime coated preform to produce a preform having a plurality of prime coats,
  applying stucco to the preform to produce a stuccoed preform having a plurality of prime coats,
  drying the stuccoed preform to produce a dried, stuccoed preform having a plurality of prime coats,
  applying the backup coat slurry to the dried, stuccoed preform having a plurality of prime coats to produce a backup coated preform,
  applying stucco onto the backup coated preform to produce a stuccoed, backup coated preform,
  drying the stuccoed, backup coated preform,
  removing the expendable preform from the backup coated preform to produce a green shell mold, and
  heating the green shell mold to a temperature sufficient to produce a fired ceramic shell mold.

13. The method of claim 12 at least one of the colloidal silica sols is modified by latex polymer.

14. A method of manufacture of an investment casting mold comprising,
  mixing one or more ceramic fillers with a first colloidal silica sol to produce a first prime coat slurry,
  mixing organic fiber with a ceramic filler to form a dry blend wherein the ceramic filler is the same or different from any of the ceramic fillers in the first prime coat slurry,
  mixing the dry blend with a second colloidal silica sol to form a second prime coat slurry wherein the second colloidal silica sol is the same or different from the first colloidal sol,
  mixing the dry blend with a third colloidal silica sol to produce a backup coat slurry wherein the third colloidal silica sol is the same or different from each of the first colloidal sol and the second colloidal sol,
  applying the first prime coat slurry onto an expendable preform to produce a first prime coated preform,
  applying stucco onto the first prime coated preform to produce a stuccoed, first prime coated preform,
  drying the stuccoed, first prime coated preform to produce a dried, stuccoed first prime coated preform,
  applying the second prime coat slurry onto the dried, stuccoed first prime coated preform to produce a preform having a plurality of prime coats,
  applying stucco to the preform having a plurality of prime coats to produce a stuccoed preform having a plurality of prime coats,
  drying the stuccoed preform to produce a dried, stuccoed preform having a plurality of prime coats,
  applying the backup coat slurry to the dried, stuccoed preform having a plurality of prime coats to produce a backup coated preform,
  applying stucco onto the backup coated preform to produce a stuccoed, backup coated preform,
  drying the stuccoed, backup coated preform,
  removing the expendable preform from the backup coated preform to produce a green shell mold, and
  heating the green shell mold to a temperature sufficient to produce a fired ceramic shell mold.

15. The method of claim 14 at least one of the colloidal silica sols is modified by latex polymer.

16. A method of manufacture of an investment casting mold comprising,
  mixing one or more ceramic fillers with a first aqueous colloidal silica sol to produce a first prime coat slurry,
  mixing nylon fiber with a ceramic filler which is the same or different from any of the ceramic fillers in the first prime coat slurry to form a dry blend,
  mixing the dry blend with a second aqueous colloidal silica sol to form a second prime coat slurry wherein the second aqueous colloidal silica sol is the same or different from the first colloidal sol,
  mixing the dry blend with a third aqueous colloidal silica sol to produce a backup coat slurry wherein the third aqueous colloidal silica sol is the same or different from each of the first colloidal sol and the second colloidal sol,
  applying the first prime coat slurry onto an expendable preform to produce a first prime coated preform,
  applying stucco onto the first prime coated preform to produce a stuccoed, first prime coated preform,
  drying the stuccoed, first prime coated preform to produce a dried, stuccoed first prime coated preform, applying the second prime coat slurry onto the dried, stuccoed first prime coated preform to produce a preform having a plurality of prime coats, applying stucco to the preform having a plurality of prime coats to produce a stuccoed preform having a plurality of prime coats, drying the stuccoed preform to produce a dried, stuccoed preform having a plurality of prime coats, applying the backup coat slurry to the dried, stuccoed preform having a plurality of prime coats to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

17. The method of claim 16 the colloidal silica sol in the backup slurry is modified by latex polymer.

18. A method of manufacture of an investment casting mold comprising, mixing ceramic filler and ceramic fiber to form a dry blend, mixing the dry blend with an aqueous colloidal silica sol to form a prime coat slurry, applying the prime coat slurry onto an expendable preform to produce a prime coated preform, applying stucco onto the prime coated preform to produce a stuccoed, prime coated preform, drying the stuccoed, prime coated preform to produce a dried, stuccoed prime coated preform, applying the slurry onto the dried, stuccoed prime coated preform to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

19. The method of claim 18 the colloidal silica sol is modified by latex polymer.

20. The method of claim 18 the blend includes a plurality of ceramic fibers.

21. A method of manufacture of an investment casting mold comprising, mixing ceramic fillers and organic fiber to form a dry blend, mixing the blend with an aqueous colloidal silica sol to form a prime coat slurry, applying the slurry onto an expendable preform to produce a prime coated preform, applying stucco onto the prime coated preform to produce a stuccoed, prime coated preform, drying the stuccoed, prime coated preform to produce a dried, stuccoed prime coated preform, applying the slurry onto the dried stuccoed, prime coated preform to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

22. The method of claim 21 the colloidal silica sol is modified by latex polymer.

23. A method of manufacture of an investment casting mold comprising, mixing ceramic filler, ceramic fiber and organic fiber to form a dry blend, mixing the blend with an aqueous colloidal silica sol to produce a prime coat slurry, applying the slurry onto an expendable preform to produce a prime coated preform, applying stucco onto the prime coated preform to produce a stuccoed, prime coated preform, drying the stuccoed, prime coated preform to produce a dried, stuccoed prime coated preform, applying the slurry onto the dried, stuccoed, prime coated preform to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

24. The method of claim 23 the colloidal silica sol is modified by latex polymer.

25. A method of manufacture of an investment casting mold comprising, forming a dry blend from a mixture of ceramic fillers and ceramic fiber, mixing the blend with an aqueous colloidal silica sol to form a prime coat slurry, applying the slurry onto an expendable preform to produce a prime coated preform, applying stucco onto the prime coated preform to produce a stuccoed, prime coated preform, drying the stuccoed, prime coated preform to produce a dried, stuccoed prime coated preform, applying the slurry onto the dried, stuccoed, prime coated preform to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

26. The method of claim 25 the colloidal silica sol is modified by latex polymer.

27. A method of manufacture of an investment casting mold comprising, forming a blend from a first mixture of ceramic fillers, and a second mixture of ceramic fibers, mixing the blend with an aqueous colloidal silica sol to form a prime coat slurry, applying the prime coat slurry onto an expendable preform to produce a prime coated preform, applying stucco onto the prime coated preform to produce a stuccoed, prime coated preform, drying the stuccoed, prime coated preform to produce a dried, stuccoed prime coated preform, applying the slurry onto the dried, stuccoed, prime coated preform to produce a backup coated preform, applying stucco onto the backup coated preform to produce a stuccoed, backup coated preform, drying the stuccoed, backup coated preform, removing the expendable preform from the backup coated preform to produce a green shell mold, and heating the green shell mold to a temperature sufficient to produce a fired ceramic shell mold.

28. The method of claim 27 the colloidal silica sol is modified by latex polymer.

29. A method of manufacture of an investment casting mold comprising,
   forming a blend from a first mixture of ceramic fillers and a second mixture of ceramic filler and organic fiber,
   mixing the blend with an aqueous colloidal silica sol to form a prime coat slurry,
   applying the slurry onto an expendable preform to produce a prime coated preform,
   applying stucco onto the prime coated preform to produce a stuccoed, prime coated preform,
   drying the stuccoed, prime coated preform to produce a dried, stuccoed prime coated preform,
   applying the slurry onto the dried, stuccoed, prime coated preform to produce a backup coated preform,
   applying stucco onto the backup coated preform to produce a stuccoed, backup coated preform,
   drying the stuccoed, backup coated preform,
   removing the expendable preform from the backup coated preform to produce a green shell mold, and
   heating the green shell mold to a temperature sufficient to produce a fired ceramic shell mold.

30. The method of claim 29 the colloidal silica sol is modified by latex polymer.

31. A method of manufacture of an investment casting mold comprising,
   forming a blend from a first mixture of ceramic fillers, and a second mixture of ceramic fiber and organic fiber,
   mixing the blend with an aqueous silica sol to produce a prime coat slurry,
   applying the slurry onto an expendable preform to produce a prime coated preform,
   applying stucco onto the prime coated preform to produce a stuccoed, prime coated preform,
   drying the stuccoed, prime coated preform to produce a dried, stuccoed prime coated preform,
   applying the slurry onto the dried, stuccoed, prime coated preform to produce a backup coated preform,
   applying stucco onto the backup coated preform to produce a stuccoed, backup coated preform,
   drying the stuccoed, backup coated preform,
   removing the expendable preform from the backup coated preform to produce a green shell mold, and
   heating the green shell mold to a temperature sufficient to produce a fired ceramic shell mold.

32. The method of claim 31 the colloidal silica sol is modified by latex polymer.

33. A method of manufacture of an investment casting mold comprising,
   mixing one or more ceramic fillers with an aqueous colloidal silica sol to produce a prime coat slurry,
   mixing a dry blend of ceramic filler and fiber with an aqueous colloidal silica sol to form a backup coat slurry,
   applying the prime coat slurry onto an expendable preform to produce a prime coated preform,
   applying stucco onto the prime coated preform to produce a stuccoed, prime coated preform,
   drying the stuccoed, prime coated preform to produce a dried, stuccoed prime coated preform,
   applying the backup coat slurry to the stuccoed, prime coated preform to produce a backup coated preform,
   applying stucco onto the backup coated preform to produce a stuccoed, backup coated preform,
   drying the stuccoed, backup coated preform,
   removing the expendable preform from the backup coated preform to produce a green shell mold, and
   heating the green shell mold to a temperature sufficient to produce a fired ceramic shell mold.

34. The method of claim 33 at least one of the colloidal silica sols is modified by latex polymer.

35. A method of manufacture of an investment casting mold comprising,
   mixing one or more ceramic fillers with an aqueous colloidal silica sol to produce a prime coat slurry that is substantially free of fiber,
   mixing a dry blend of ceramic filler and fiber with an aqueous colloidal silica sol to form a backup coat slurry,
   applying the prime coat slurry onto an expendable preform to produce a prime coated preform,
   applying stucco onto the prime coated preform to produce a stuccoed, first prime coated preform,
   drying the stuccoed, prime coated preform to produce a dried, stuccoed prime coated preform,
   applying the backup coat slurry to the stuccoed, prime coated preform to produce a backup coated preform,
   applying stucco onto the backup coated preform to produce a stuccoed, backup coated preform,
   drying the stuccoed, backup coated preform,
   removing the expendable preform from the backup coated preform to produce a green shell mold, and
   heating the green shell mold to a temperature sufficient to produce a fired ceramic shell mold.

36. The method of claim 35 at least one of the colloidal silica sols is modified by latex polymer.

* * * * *